(12) United States Patent
Sakane et al.

(10) Patent No.: US 7,194,150 B2
(45) Date of Patent: Mar. 20, 2007

(54) OPTICAL MODULATION ELEMENT MODULE

(75) Inventors: Toshio Sakane, Tokyo (JP); Tsutomu Saitou, Tokyo (JP); Susumu Murata, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 74 days.

(21) Appl. No.: 11/199,732

(22) Filed: Aug. 9, 2005

(65) Prior Publication Data

US 2006/0028711 A1 Feb. 9, 2006

(30) Foreign Application Priority Data

Aug. 9, 2004 (JP) ............................. 2004-232742

(51) Int. Cl.
*G02F 1/01* (2006.01)
(52) U.S. Cl. .................. 385/1; 385/2; 385/14; 385/92; 385/94
(58) Field of Classification Search ..................... 385/1, 385/2, 3, 14, 8, 9, 31, 38, 39, 99, 98, 94, 385/92, 93
See application file for complete search history.

(56) References Cited

U.S. PATENT DOCUMENTS 5,446,811 A * 8/1995 Field et al. .................... 385/23
6,205,264 B1 * 3/2001 Jin et al. ....................... 385/14
6,220,764 B1 * 4/2001 Kato et al. ..................... 385/92
6,457,877 B2 * 10/2002 Kato et al. ..................... 385/92
6,647,185 B2 * 11/2003 Hajjar et al. ................... 385/48
6,871,084 B1 * 3/2005 Kingsley et al. ............. 600/372

* cited by examiner

*Primary Examiner*—Brian M. Healy
(74) *Attorney, Agent, or Firm*—Chapman and Cutler LLP

(57) ABSTRACT

The present invention provides an optical modulation element module capable of stably operating for long periods without limiting the operating conditions. An optical modulation element module comprising an optical modulation element 12, a case 11 with said optical modulation element being integrated thereto, input output fibers 13, 14 being connected to said optical modulation element and also guided to an exterior of said case, a terminal for introducing a modulating signal and a bias adjustment voltage that are to be applied to said optical modulation element, said case being hermetically sealed, is characterized in that said case 11 is made of a material having almost the same coefficient of linear expansion as the optical modulation element 12, said optical modulation element is affixed to said case by using a thermoplastic and high-elastic adhesive material 19, a linear expansion difference between each material of said case and said fiber is less than $16 \times 10^{-6}/°C$., and a distance between a fixed point of said fiber with said case, and a fixed point of said fiber with said optical modulation element is more than 3 mm.

8 Claims, 6 Drawing Sheets

(a)

(b)

(c)

OPTICAL MODULATION ELEMENT MODULE

BACKGROUND OF THE INVENTION

(1) Field of the Invention

The present invention relates to an optical modulation element module comprising an optical modulation element being integrated into a case, and in particular to an optical modulation element module which can be stably used especially in a hot environment.

(2) Related Art Statement

At present, optical modulation element is frequently used as one of the means for generating a light signal in the field of optical communication. The operating environment is normally in the range of −10° C. to 75° C. and the storage temperature is in the range of −40° C. to 85° C. for such optical modulation element for communication. In addition, the optical modulation element is assured of operating in that temperature range and of not being damaged during storage.

The optical modulation element has been used in various environments in recent years. Even when, for example, it is necessary to put a signal source in a hot environment such as a remote sensing technique like the underground resources exploration or the seismic layer exploration, needs for use of the optical modulation element has been appearing.

For the remote sensing technique for investigating the underground status, a hole for exploration 1 is dug, and a sensor 7 detects information such as pressure, temperature, mineral, gas or the like under the ground as shown in FIG. 1. An optical modulation element 4 is positioned adjacent to sensor 7 in order to send the detected information by sensor 7 in the form of a light signal. A light source 3, an optical detector 9 etc. are positioned on the ground in order to gain highly accurate information avoiding influence from an electro-magnetic field, a difference in ground-fault electric potential, a magnetic filed or the like. Optical modulation element 4 is connected to light source 3 or optical detector 9 via optical fibers 5 or 6. Then, a light exiting from light source 3 is modulated by optical modulation element 4. The modulated light signal is received by optical detector 9 and is converted to electricity. After that, it reconstructs the information related to sensor 7 on the ground by demodulator 10.

For such remote sensing technique, it is necessary to position optical modulation element 4 adjacent to sensor 7 in order to transmit the signal from sensor 7 without degrading it. Under the ground, the environment temperature rises about 1° C./30 m against the depth of a measuring point. Thus, because exploration is performed in a deep layer of 5 km for the underground resources exploration and the seismic layer exploration, the environment temperature of optical modulation element 4 becomes around 200° C. in some cases.

An optical modulator of normal configuration would have various problems in such environment temperature.

In particular, there are problems such as (1) the rupture of a fiber due to degradation of the fiber jacket's material, (2) an increase in optical insertion loss due to thermal degradation of each adhesive material which affixes constituent members to a case or to each other, and (3) the rupture of a fiber due to a difference in linear expansion between a case and a fiber.

(4) Further, a so-called LN optical modulator as an optical modulation element has problems as below, the LN optical modulator forming a Mach-Zehnder type waveguide on the surface of an $LiNb_3$ crystal, applying a modulating signal between electrodes being positioned adjacent to said waveguide, intensely modulating an input light and outputting the modulated light. Although it is necessary to apply a DC voltage between electrodes in order to set an operating point, internal electric field is generated due to said DC voltage and said internal electric field works in the direction of canceling the effect of said applied voltage. Therefore, it is necessary to apply bigger DC voltage in order to keep the operating point stable (DC drift phenomenon). Further, said DC drift is influenced a lot by the applied voltage amount and the environment temperature. It takes shorter to reach the upper limit of the applied DC voltage as the initial DC voltage gets bigger, or the temperature gets higher. Said time until the upper limit is an operation life and operating conditions are limited.

(5) Because the operating point shifts in accordance with a temperature (a temperature drift), operating conditions are limited in a hot temperature environment.

SUMMARY OF THE INVENTION

The present invention intends to solve the above-described problems, and to provide an optical modulation element module capable of stably operating for long periods without limiting the operating conditions.

The invention related to claim 1 provides an optical modulation element module comprising an optical modulation element, a case with said optical modulation element being integrated thereto, input/output fibers being connected to said optical modulation element and also guided to an exterior of said case, and a terminal for introducing a modulating signal and a bias adjustment voltage that are to be applied to said optical modulation element, said case being hermetically sealed, wherein said case is made of a material having almost the same coefficient of linear expansion as the optical modulation element, said optical modulation element is affixed to said case by using a thermoplastic and high-elastic adhesive material, a linear expansion difference between each material of said case and said fiber is less than $16 \times 10^{-6}$/° C., and a distance between a fixed point of said fiber with said case, and a fixed point of said fiber with said optical modulation element is more than 3 mm. However, when a capillary is used for affixing said fiber to said optical modulation element, the above distance means the distance from the end face of the capillary opposite to the optical modulation element to the fixed point of the fiber with the case.

The invention related to claim 2 provides the optical modulation element module of claim 1, wherein said optical modulation element and said fiber are connected by butt connection, a capillary with an outside diameter of more than 1.25 mm is a reinforcing member, and an optical adhesive material with a shearing force of more than 180 $kgf/cm^2$ and a glass-transition temperature of more than 230° C. is used.

The invention related to claim 3 or 4 provides the optical modulation element module of claim 1 or 2, wherein a quad operating point of said optical modulation element is preadjusted to be almost 0 volt, or a specific operating point is pre-adjusted to be almost 0 volt, when it is modulated.

The invention related to any one of claims 5 to 8 provides the optical modulation element module of any one of claims 1 to 4, wherein a jacket's material of said fiber is made of polyimide, and said fiber is affixed to said case by an adhesive material having lower glass-transition temperature than a glass-transition temperature of an adhesive material that bonds said fiber to said optical modulation element.

In accordance with the invention related to claim 1, by selecting each material such that the case has almost the same coefficient of linear expansion as the optical modulation element, and using the thermoplastic and high-elastic adhesive material for affixing the optical modulation element to the case, it becomes possible to minimize mutual deviation of the optical modulation element and case when they expands in a hot environment. Even when mutual deviation occurs, it becomes possible to reduce stress on the junction of them because the adhesive material has high elasticity. Thus, it becomes possible to reduce stress on the optical modulation element and thereby prevent a temperature drift phenomenon.

Further, because the linear expansion difference between each material of said case and said fiber is less than $16 \times 10^{-6}/°$ C., and the distance between the fixed point of said fiber with said case, and the fixed point of said fiber with said optical modulation element is more than 3 mm, it becomes possible to prevent the rupture of the fiber even in a hot environment, and also, to facilitate alignment in assembling and adjusting the optical modulation element and case.

In accordance with the invention related to claim 2, the optical modulation element and the fiber are connected by butt connection (the connecting method that makes direct contact between the two without leaving any space), the capillary with an outside diameter of more than 1.25 mm is the reinforcing member, and the optical adhesive material with a shearing force of more than 180 kgf/cm$^2$ is used. Therefore, it becomes possible to prevent the problem that the optical modulation element and fiber are disconnected by shearing stress generated on the junction of the optical modulation element and fiber in a hot environment.

Further, by making the glass-transition temperature of the optical adhesive material described in Claim 2 more than 230° C., it is possible to maintain the connection state of the optical modulation element and fiber even when the maximum operating temperature of the optical modulation element module is more than 200° C. Then, it becomes possible to avoid problems such as interruption of a light signal due to breaking away of the junction. Even if the junction is not broken away, it becomes possible to prevent an increase in optical insertion loss due to the adhesive material degradation because the glass-transition temperature of the adhesive material is high.

In accordance with the invention related to claim 3 or 4, because the quad operating point of said optical modulation element is pre-adjusted to be almost 0 volt, or the specific operating point is pre-adjusted to be almost 0 volt, there is little need to apply a DC bias when a drift phenomenon is not generated. Thus, it becomes possible to make the operation life of the optical modulation element long.

In accordance with the invention related to any one of claims 5 to 8, the jacket's material of the fiber is made of polyimide, and the fiber is affixed to the case by the adhesive material having lower glass-transition temperature than the glass-transition temperature of the adhesive material that bonds the fiber to the optical modulation element. Therefore, it becomes possible to prevent the fiber rupture due to degradation of the fiber jacket's material, or an increase in optical insertion loss due to degradation of the adhesive material at the fixed part of the fiber with the case. Further, because the glass-transition temperature of the adhesive material that bonds the fiber to the case is lower than the glass-transition temperature of the adhesive material that connects the fiber and optical modulation element, the adhesive material that bonds the fiber to the case get melted first when the temperature rises. Therefore, it becomes possible to prevent an extra tensile force on the junction of the fiber and optical modulation element.

It is possible to provide the optical modulation element module having a stable and long operation life even in a maximum operating temperature of 200° C. by using each technology as stated above singly or combining them appropriately.

Figure 1:
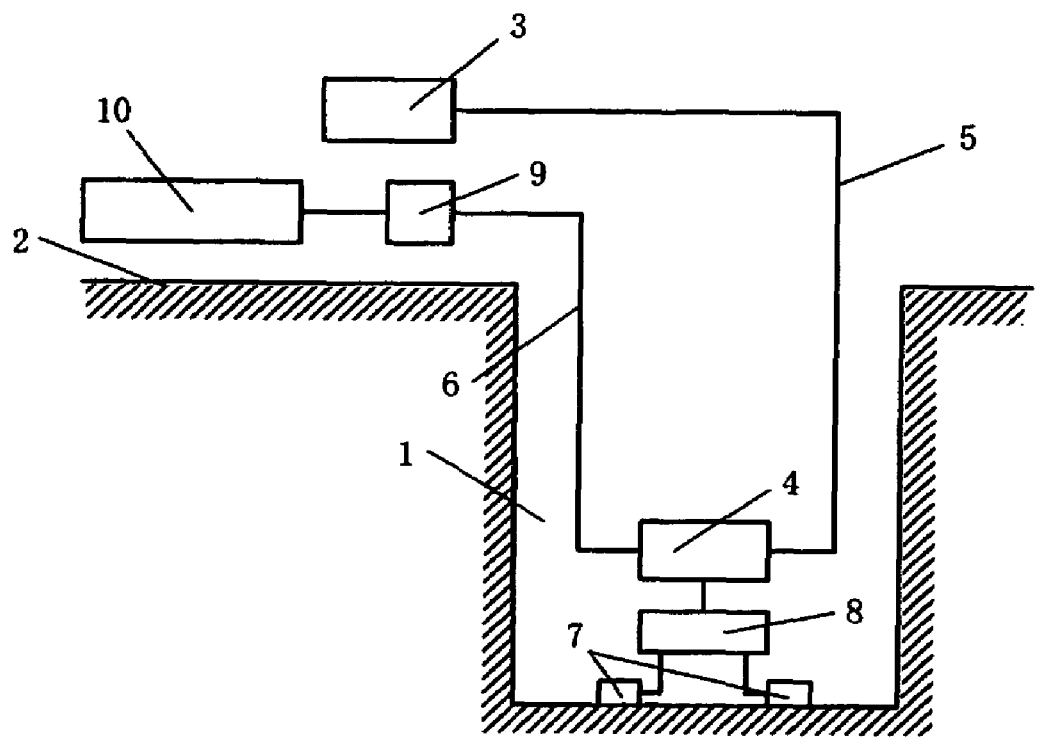
FIG. 1 is a diagram showing the remote sensing technique.

EXPLANATIONS OF NUMERALS 1 deep exploration hole
3 light source
4 optical modulation element
7 sensor
8 data converter
9 optical detector
10 demodulator
12 LN chip
13, 14 fiber
19 high-elastic adhesive material
20, 21 solder sealing part
26, 27, 28, 28 high Tg adhesive material
43 high refractive index part

DETAILED DESCRIPTION OF THE INVENTION

The optical modulation element module according to the present invention is explained in detail in the following.

In the following, the present invention is explained mainly with an LN optical modulation element that is a surface waveguide element using a LiNbO$_3$ crystal (hereinafter referred to as LN), as the optical modulation element. However, the optical modulation element is not limited to this but another surface waveguide element using a substrate with an electro-optic effect can be used as well. Further, the same effect can be obtained when a passive module that sends and receives a light in or out of a case via fiber is used.

The optical modulation element module according to the present invention is preferably used in a hot environment such as the remote sensing technique as shown in FIG. 1. A sensor 7 detects various types of information such as pressure, temperature, mineral, gas or the like under the ground. For example, the information from sensor 7 is converted to digital PRBS (pseudo random signal sequence) at a data converter 8 and such digital signal is applied to an optical modulation element 4.

A light source 3, such as a semiconductor laser, being positioned on the ground outputs a continuous light or a pulse light having a given frequency, which is introduced into optical modulation element 4 via an optical fiber 5. The light input from optical fiber 5 is modulated in accordance with an electrical signal (modulating signal) from data converter 8 while passing optical modulation element 4. Then, it is guided to an optical fiber 6 as a signal light. The signal light is configured to enter an optical detector 9, be converted to an electrical signal corresponding to said signal light, and reconstruct the information related to sensor 7 on the ground by a demodulator 10.

The optical modulation element module according to the present invention comprises optical modulation element 4, a case with said optical modulation element being integrated thereto, input output fibers 5, 6 being connected to said optical modulation element and also guided to an exterior of said case, and a terminal for introducing a modulating signal and a bias adjustment voltage that are to be applied to said optical modulation element, said case being hermetically sealed.

Figure 2:
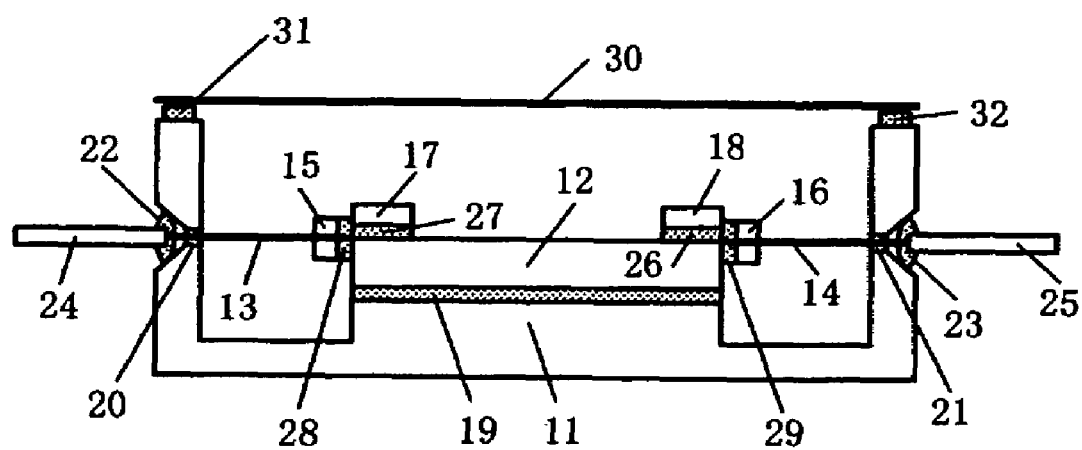
FIG. 2 is a cross-section diagram of the optical modulation element module according to the present invention.

FIG. 2 is a cross-section diagram showing the LN optical modulation element module.

The LN optical modulation element module comprises a case 11, an LN chip 12 corresponding to optical modulation element 4, an input fiber 13 constituting an outgoing end of optical fiber 5, an output fiber 14 constituting an incoming end of optical fiber 6, capillaries 15, 16 that are stiffeners for connecting each fiber to chip 12, stiffening members 17, 18 that are stiffeners of the LN chip end face, jackets 24, 25 for protecting each fiber, a cover 30 for hermetically sealing case 11 and so on. It also comprises an RF terminal for inputting the modulating signal, and a DC terminal for inputting the bias adjustment voltage that are not shown in the figure.

SUS (stainless steel) that has almost the same coefficient of linear expansion as LN chip 12 is used as a material of case 11. LN pieces made of the same material as the LN chip are used for stiffening members 17 and 18 by arranging the LN pieces in the same axial direction as said LN chip. Further, a glass material made of almost the same material as fibers 13 and 14 is used as capillaries 15 and 16.

LN chip 12 is adhesively affixed to case 11 with an adhesive material 19. Here, if a normally-used conductive adhesive material is used, the LN chip becomes distorted because the conductive adhesive material has a low elastic modulus and it cannot absorb the stress generated by a linear expansion difference between LN chip 12 and case 11 in a significant temperature change (for example, −40° C. to 200° C., the range being an operating temperature range in the following explanation). Such distortion leads to a shift of the operating point of the optical modulation element, and thereby causes a temperature drift.

However, by using a heat curable adhesive material that is thermoplastic and has a high elastic modulus (the elastic modulus at 25° C. is more than 4200 kg/cm$^2$) and further configuring said adhesive affixation to be heat-hardened at more than the maximum operating temperature (200° C.), it becomes possible that adhesive material 19 maintains its strength in said operating temperature range and to absorb the stress to thereby avoid generation of the distortion. As a result, the temperature drift can be reduced.

Figure 3:
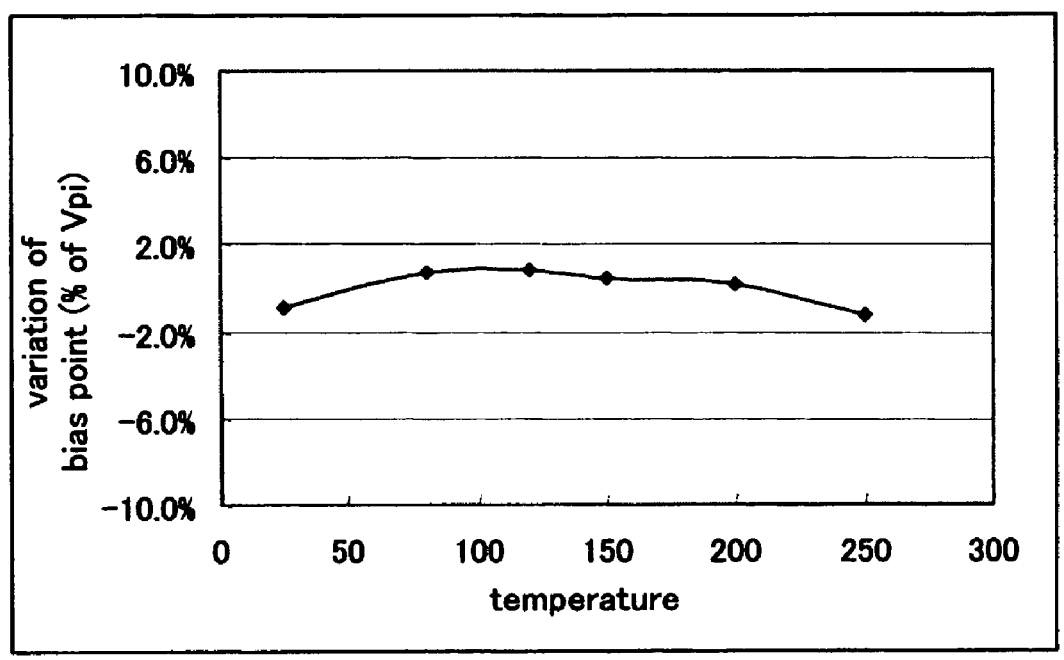
FIG. 3 shows an example of temperature drift of the optical modulation element module according to the present invention.

FIG. 3 shows the measurement example of the temperature drift of the LN optical modulation element module comprising the LN chip being affixed to the case (using SUS303, SUS304) with the heat curable adhesive material by the above method. The fluctuation of operating point is restricted to 3% or less in proportion to the half wavelength voltage (Vpi) of the optical modulation element in the range of 25° C. to 250° C.

20 and 21 in FIG. 2 are the parts where fibers 13, 14, the fibers being partly solder plated, and case 11 are hermetically sealed by using a solder having the melting point of more than the maximum operating temperature (200° C.) (especially a solder with the softening point lower than the glass-transition temperature of the adhesive material that bonds the fibers to the optical modulation element). In addition, 22 and 23 show the parts where fibers 13 and 14 together with jackets of fiber 24 and 25 are adhesively affixed to the case with the adhesive material having a permissible maximum temperature of more than 200° C.

An adhesive material having lower rigidity in comparison with parts 28 and 29 for connecting the fiber and optical modulation element as described below, and capable of continuously operating at the maximum operating temperature can be used as adhesive materials 22 and 23 because they have the function of affixing the fiber to the case. From this point, a non-optical epoxy resin adhesive material having a glass-transition temperature of more than 150° C. is used.

Jackets of fibers 24 and 25 are polyimide coverings which are stable in the maximum operating temperature.

Further, an optical UV curing epoxy resin adhesive material having a glass-transition temperature (Tg) of more than 200° C. is used for adhesive joints 26, 27 of stiffening members 17, 18 and LN chip, and adhesive joints 28, 29 of capillaries 15, 16 and LN chip ends. It is used to solidify them by irradiating it with a given UV light after alignment, and perform heat curing in a hotter temperature than the maximum operating temperature.

If glass transition temperature Tg is lower than the maximum operating temperature, rigidity of adhesive joints 26 to 29 decreases at said maximum temperature. The stress of the fiber as described below moves the fiber and optical insertion loss increases as a result. Because the above-described procedures strengthen the relationship between the fiber and the waveguide of the optical modulation element in said operating temperature range, it is possible to realize butt connection small enough to ignore the change in insertion loss.

Cover 30 and case 11 are sealed by normal seam welding. Or high melting solders 31 and 32 are provided between case 11 and cover 30 to seal them.

The means for solving the above conventional problems (1), (2) and (5) are explained hereinbefore. Subsequently, the means for solving the above problem (3) is explained.

Fibers are normally characterized in that they are resistant to compression but vulnerable to tensile force, and therefore, they reduce stress by buckling when compressed, but results in rupture when strained.

Also, the coefficient of linear expansion of the material used for the case is one order of magnitude more than that of the fiber. For example, the difference between SUS of case 11 and the fiber is $1.55 \times 10^{-5}$/deg.

Figure 4:
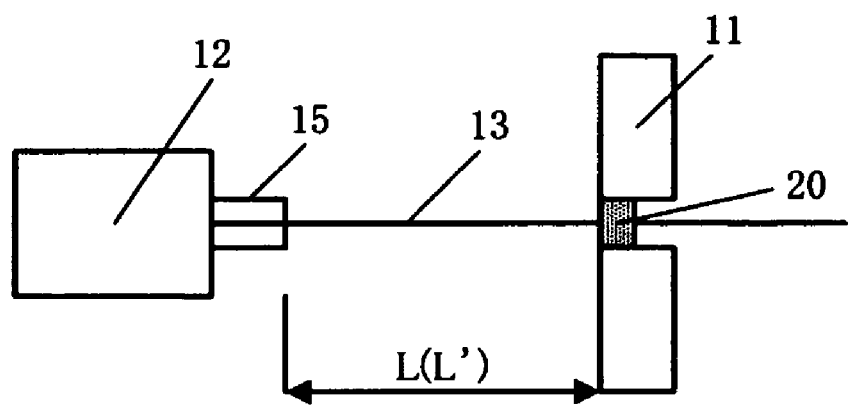
FIGS. 4(a)–(c) are diagrams explaining prevention of the fiber rupture in the case.
Figure 4:
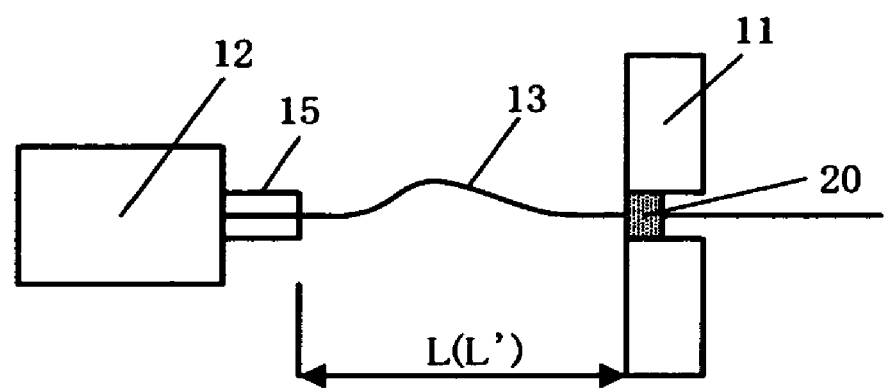
Figure 4:
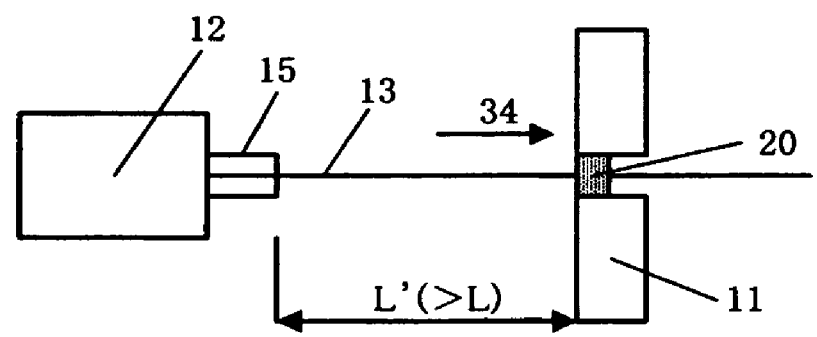

FIGS. 4(*a*)–(*c*) show the state of the fiber in the module. Input fiber 13 is explained as an example in the following. Here, L means the distance between the end faces of capillary 15 of fiber 13 and the case (the fixed point of the fiber with the case). When fiber 13 in said L region is a straight line in an environmental temperature lower than the maximum operating temperature as in FIG. 4(*a*), said distance L expands to be distance L' in the maximum operating temperature as in FIG. 4(*c*). Then, fiber 13 is easily ruptured because the tensile force indicated by an arrow 34 works on it from capillary 15 as a fixed point.

In order to solve this problem, fiber 13 is affixed to case 11 by solder 20 such that the fiber becomes a straight line (FIG. 4 (*a*)) or buckles to some extent (FIG. 4(*b*)) in the maximum operating temperature.

Figure 5:
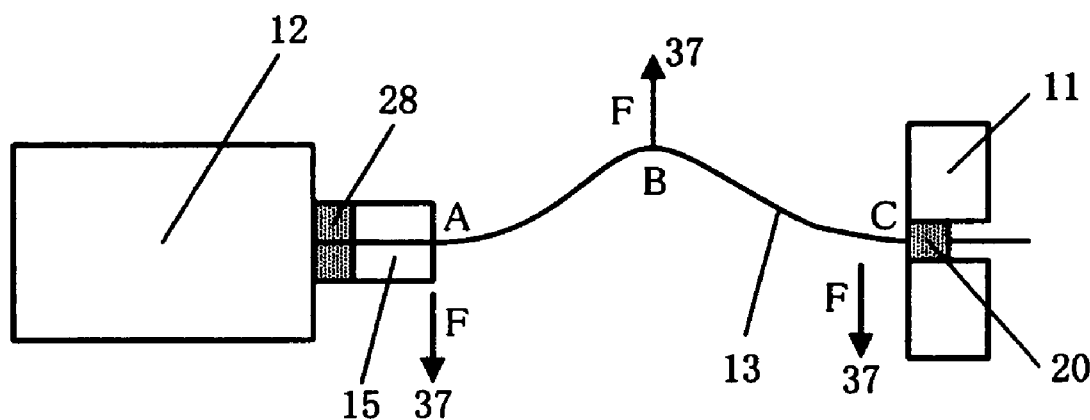
FIG. 5 is a diagram showing the condition of the shearing stress related to the fiber in the case.

The problem in such buckling state is a shearing force on the fiber in the minimum temperature. In the buckling state as shown in FIG. 5, fiber 13 is a curved line. In this case, both ends (A, C) and central part (B) of the fiber respectively receives shearing stress F37 of the same amount. This shearing stress F37 varies in accordance with the fiber length before buckling.

Figure 6:
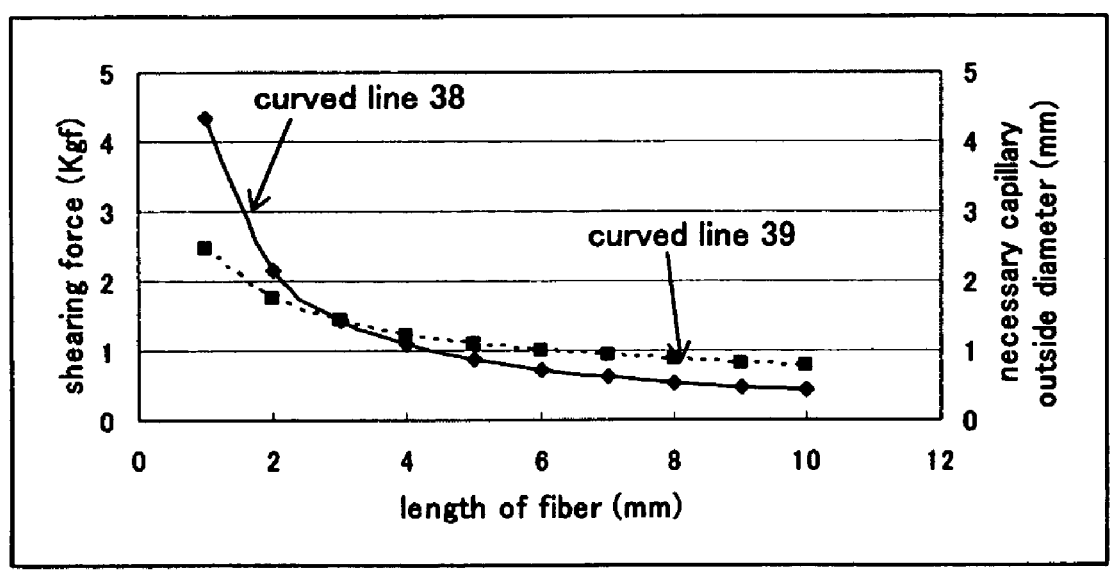
FIG. 6 is a graph explaining the relationship of the shearing force or the outside diameter of the capillary to the length of the fiber.

The horizontal scale in FIG. 6 is the length of the fiber. The shearing stress (curved line 38) at a temperature of −45° C. when a linear expansion difference between the fiber and case is $15.5 \times 10^{-6}$, and they are sealed at a temperature of 220° C. (the fiber is a straight line without tensile force at a temperature of 220° C.) is indicated in FIG. 6.

Because the shearing force of the fiber is around 6.5 kgf, the fiber doesn't get ruptured at each point of A, B, and C in FIG. 5. However, the part bonding the fiber with the LN chip could be important. The shearing force of a junction 28 is calculated by multiplying the shearing force of adhesive material by adhesive area. Thus, when an adhesive material with a shearing force of 180 kgf/cm$^2$ is used as the above optical adhesive material with high Tg for butt connection, the diameter necessary as capillary 15 with a safety factor of 2 is a curved line 39 in FIG. 6. In other words, FIG. 6 shows the outside diameter (right vertical scale) of capillary required for realizing twice (safety factor) as shearing force as the shearing force of certain fiber length (horizontal scale).

Because the thickness of LN chip 12 and stiffening member 17 is respectively 0.5 to 1.0 mm, the potential diameter of capillary 16(15) is 1 to 2 mm.

When the safety factor of rupture is 2 against the diameter (outside diameter) of the capillary, the allowable fiber length is around 6 mm when the capillary diameter is 1 mm, and around more than 1.5 mm when the capillary diameter is 2 mm.

Because the market requires shortening of the optical modulation element module, it is necessary to shorten the length of the above fiber 13(14) as much as possible. However, comprehensively considering the necessary diameter of the capillary, a margin for alignment in assembling the module, or the like, a capillary diameter of 1.25 mm and a fiber actual length of 3 mm are practical values.

Next, the means for solving the above problem (4) is explained.

Figure 7:
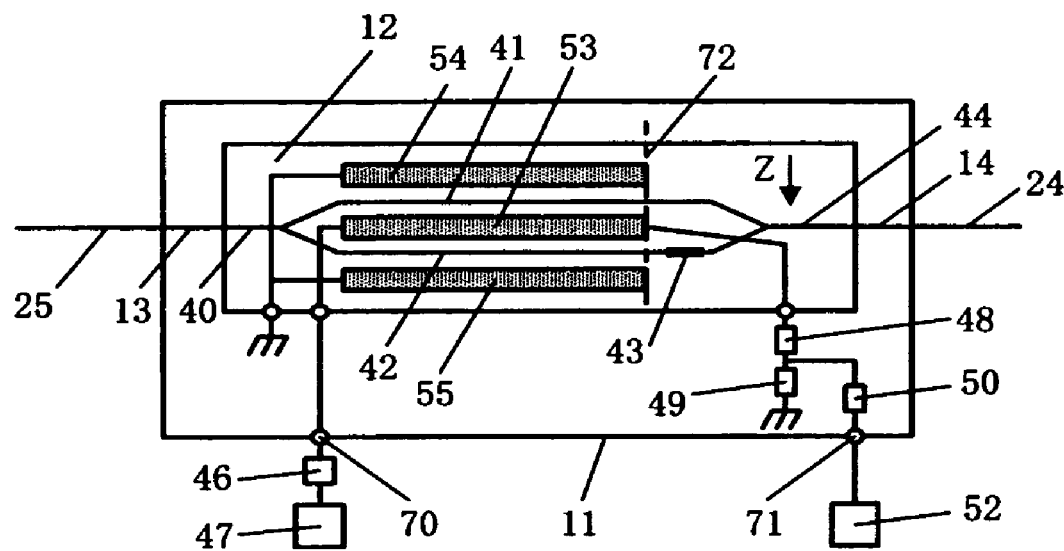
FIG. 7 is a diagram showing the LN chip.

FIG. 7 shows the configuration of LN chip using the X-cut substrate (the substrate having the crystal axis capable of changing a refractive index most effectively by an electro-optic effect in a direction parallel to the substrate surface(the direction of an arrow Z in FIG. 7)). Waveguides 40, 41, 42, and 44 are formed on the surface of LN chip 12. Said waveguides 40 and 44 are input waveguide and output waveguide respectively. Said waveguides 41 and 42 are respective branching waveguide of the Mach-Zehnder (MZ) type waveguide.

It is configured such that electrodes 53, 54 and 55 are formed adjacent to branching waveguides 41 and 42, an RF signal that is a modulating signal is applied to electrode 53 from a signal source 47 via a capacitor 46, and in propagating lights, waveguides 41 and 42 are mutually modulated.

A DC voltage from a DC power supply 52 is applied to electrode 53 via a resistor 50 connected to the midpoint of the terminators (resistor 48 and capacitor 49) for setting a bias point of the optical modulation element. An RF terminal 70 for inputting a modulating signal, and a DC terminal 71 for imputing a bias adjustment voltage are provided on case 11 in order to introduce an electrical signal from an exterior into case 11 with integrated LN chip 12.

A light input from input fiber 13 enters input waveguide 40, is divided half by half at the Y branching, and propagates branching waveguides 41 and 42.

Said lights propagating the branching waveguides receive phase change by the RF signal being applied to electrode 53, and are combined together by the Y branching waveguides on the back side of the branching waveguides. Then, it propagates output waveguide 44 as an intensely modulated light, and is output to output fiber 14. The optical modulation element with the MZ type waveguide normally has branching waveguides of the same length.

Figure 8:
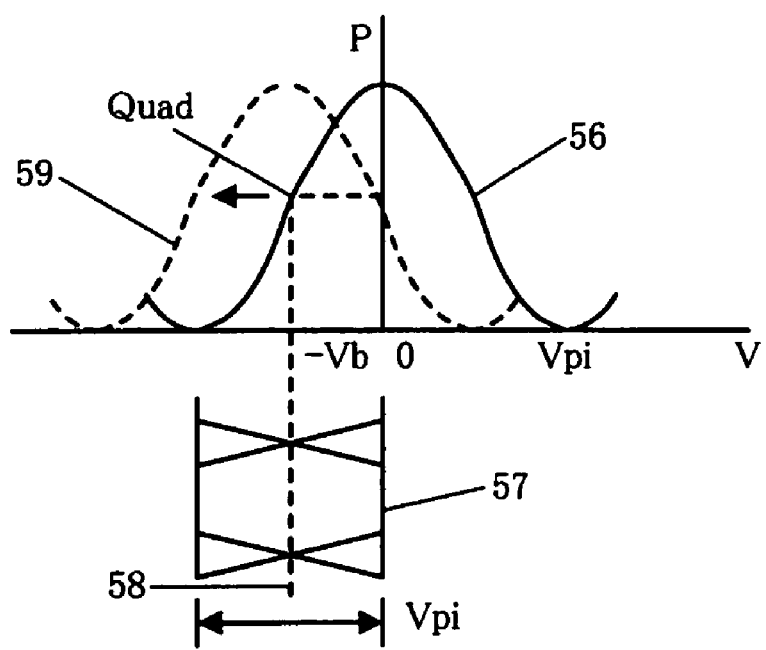
FIG. 8 is a graph explaining the DC drift of the modulation curve.

Here, a modulation curve 56 of the optical modulation element shows peak output when the bias voltage is OV as shown in FIG. 8. It is necessary to apply a DC bias voltage of −Vb (Vb=Vpi/2) such that a midpoint 58 of a PRBS electrical signal 57 becomes quad against said modulation curve 56, in order to convert PRBS electrical signal 57 with a swing of Vpi into a light.

Because internal electric field is generated on the LN optical modulation element due to application of a DC voltage and said internal electric field is in an opposite direction, a phenomenon that the applied DC voltage apparently decreases, so-called a DC drift phenomenon occurs.

The modulation curve shifts in a traverse direction against the applied voltage due to the DC drift, and becomes the dotted curved line 59 in FIG. 8.

In order to keep the operating point on the modulation curve constant, it is necessary to greaten the applied voltage of the DC bias. Although an automatic bias control device is provided so as to automatically follow the movement of said operating point, there is a limit (problems of power source, dielectric breakdown between LN electrodes) for the voltage that can be supplied, and therefore, it is necessary to reset operation when it reaches said limit value. This term until the reset is an operation life and it is preferable as said term becomes longer. In other words, it is preferable as DC drift is smaller.

Figure 9:
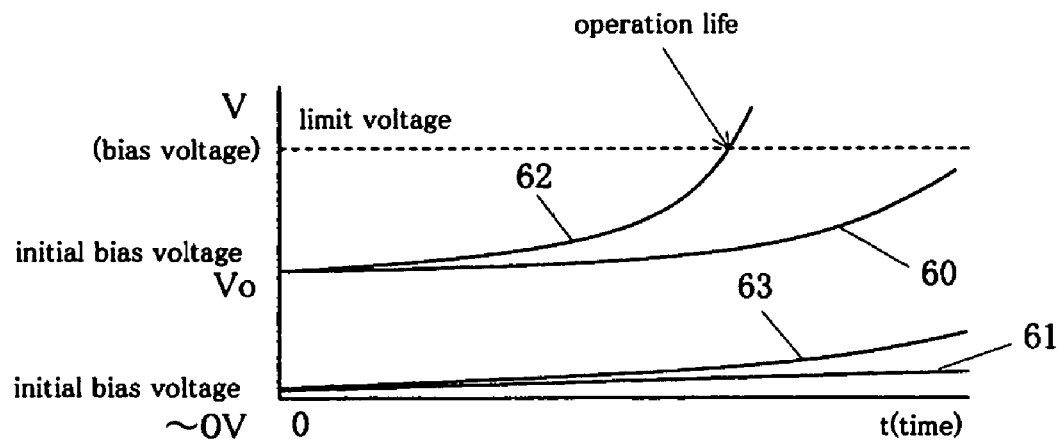
FIG. 9 is a graph showing the change of a DC bias voltage with time.

The DC drift phenomenon changes due to a temperature and an initial applied voltage. FIG. 9 conceptually shows the change of the DC bias voltage with time. 60 and 61 show the difference of the initial applied voltages, and 62 and 63 show the drift state in a hot environment for 60 and 61.

The DC drift exponentially increases against the temperature. When the maximum operating temperature is more than 200° C., special attention should be given to it. It is particularly preferable to set the initial bias point as adjacent to 0V.

Figure 10:
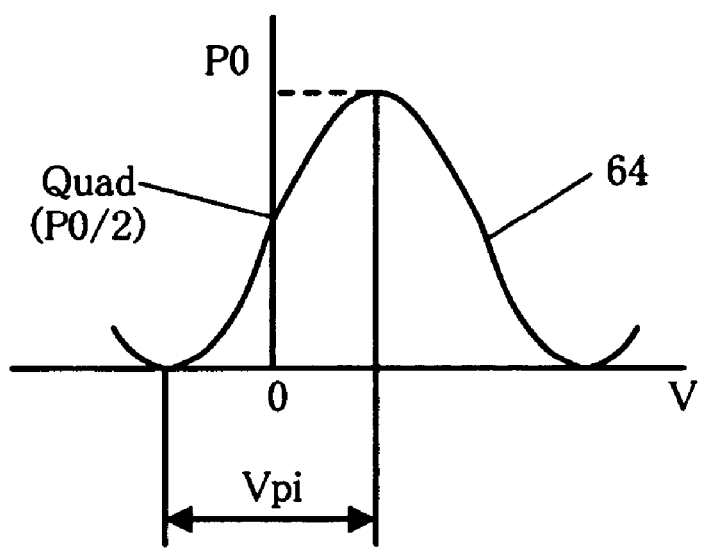
FIG. 10 is a graph showing the modulation curve when the quad operating point of the optical modulation element is almost 0V.

A method for making the quad operating point of the optical modulation element almost 0V is explained using FIG. 7 and FIG. 10.

In FIG. 7, the phase difference of the light propagating between branching waveguides 41 and 42 is shifted π/2 by greatening the refractive index of the waveguides, such as widening the width of the waveguides, at one part of the back side (to the right of a dotted line 72 in FIG. 7, and this part does not overlap with electrode 53 in a longitudinal direction) of waveguide 41 or 42 (or both waveguides). 43 indicates a high refractive index part in FIG. 7. As a result, an operating curve shifts rightward from initial curved line 56 as curved line 64 in FIG. 10. In other words, by setting appropriate refractive index of the branching waveguides and appropriate length of the region changing said refractive index, curved line 64 with the quad point of 0V can be obtained.

By making the quad operating point of the optical modulation element almost 0V, the DC drift phenomenon of the optical modulation element module becomes curve line 63 in FIG. 9 even in the maximum operating temperature. Then, a long period of operation life can be realized.

In addition, it is possible to change the refractive index by decreasing it as well as increasing it as stated above. Although it is preferable to configure each branching waveguide to be of the same length as state above, it is also possible to configure the branching waveguides to have difference lengths in order to adjust the quad operating point.

As stated above, the present invention can provide the optical modulation element module capable of stably operating for long periods even in a hot environment without limiting the operating conditions.

The invention claimed is:

1. An optical modulation element module comprising
   an optical modulation element,
   a case with said optical modulation element being integrated thereto,
   input output fibers being connected to said optical modulation element and also guided to an exterior of said case, and
   a terminal for introducing a modulating signal and a bias adjustment voltage that are to be applied to said optical modulation element, said case being hermetically sealed, wherein:
   said case is made of a material having almost the same coefficient of linear expansion as the optical modulation element;
   said optical modulation element is affixed to said case by using a thermoplastic and high-elastic adhesive material;
   a linear expansion difference between each material of said case and said fiber is less than $16\times10^{-6}/°$ C.; and
   a distance between a fixed point of said fiber with said case, and a fixed point of said fiber with said optical modulation element is more than 3 mm.

2. The optical modulation element module of claim 1, wherein said optical modulation element and said fiber are connected by butt connection, a capillary with an outside diameter of more than 1.25 mm is a reinforcing member, and an optical adhesive material with a shearing force of more than 180 kgf/cm$^2$ and a glass-transition temperature of more than 230° C. is used.

3. The optical modulation element module of claim 1, wherein a quad operating point of said optical modulation element is pre-adjusted to be almost 0 volt, or a specific operating point is pre-adjusted to be almost 0 volt, when it is modulated.

4. The optical modulation element module of claim 2, wherein a quad operating point of said optical modulation element is pre-adjusted to be almost 0 volt, or a specific operating point is pre-adjusted to be almost 0 volt, when it is modulated.

5. The optical modulation element module of claim 1, wherein a jacket of said fiber is made of polyimide, and said fiber is affixed to said case by an adhesive material having lower glass-transition temperature than a glass-transition temperature of an adhesive material that bonds said fiber to said optical modulation element.

6. The optical modulation element module of claim 2, wherein a jacket of said fiber is made of polyimide, and said fiber is affixed to said case by an adhesive material having lower glass-transition temperature than a glass-transition temperature of an adhesive material that bonds said fiber to said optical modulation element.

7. The optical modulation element module of claim 3, wherein a jacket of said fiber is made of polyimide, and said fiber is affixed to said case by an adhesive material having lower glass-transition temperature than a glass-transition temperature of an adhesive material that bonds said fiber to said optical modulation element.

8. The optical modulation element module of claim 4, wherein a jacket of said fiber is made of polyimide, and said fiber is affixed to said case by an adhesive material having lower glass-transition temperature than a glass-transition temperature of an adhesive material that bonds said fiber to said optical modulation element.

* * * * *